United States Patent
Choudhary

(10) Patent No.: US 11,392,774 B2
(45) Date of Patent: Jul. 19, 2022

(54) EXTRACTING RELEVANT SENTENCES FROM TEXT CORPUS

(71) Applicant: INTERNATIONAL BUSINESS MACHINES CORPORATION, Armonk, NY (US)

(72) Inventor: Abhay Choudhary, Dublin (IE)

(73) Assignee: International Business Machines Corporation, Armonk, NY (US)

(*) Notice: Subject to any disclaimer, the term of this patent is extended or adjusted under 35 U.S.C. 154(b) by 298 days.

(21) Appl. No.: 16/785,908

(22) Filed: Feb. 10, 2020

(65) Prior Publication Data

US 2021/0248324 A1    Aug. 12, 2021

(51) Int. Cl.
| | |
|---|---|
| *G06F 40/30* | (2020.01) |
| *G06N 5/04* | (2006.01) |
| *G06F 40/253* | (2020.01) |
| *G06F 16/28* | (2019.01) |
| *G06N 20/00* | (2019.01) |

(52) U.S. Cl.
CPC ............ *G06F 40/30* (2020.01); *G06F 16/285* (2019.01); *G06F 40/253* (2020.01); *G06N 5/04* (2013.01); *G06N 20/00* (2019.01)

(58) Field of Classification Search
CPC ...... G06F 40/30; G06F 16/285; G06F 40/253; G06F 40/216; G06F 40/284; G06F 40/268; G06N 5/04; G06N 20/00
USPC ....................................................... 704/900
See application file for complete search history.

(56) References Cited

U.S. PATENT DOCUMENTS

| | | | |
|---|---|---|---|
| 7,346,491 B2 | 3/2008 | Kanagasabai et al. | |
| 2003/0004716 A1 | 1/2003 | Haigh et al. | |
| 2003/0236659 A1* | 12/2003 | Castellanos ........... | G06F 40/211 704/4 |
| 2008/0172415 A1* | 7/2008 | Fakhari ................. | G06Q 10/10 |
| 2009/0157619 A1* | 6/2009 | Oates ..................... | G06Q 10/00 |
| 2009/0276460 A1* | 11/2009 | Dane ...................... | G06Q 10/10 |
| 2012/0123768 A1 | 5/2012 | Liu et al. | |
| 2013/0198126 A1* | 8/2013 | Kumar .................. | G06F 40/279 706/46 |

(Continued)

FOREIGN PATENT DOCUMENTS

| | | |
|---|---|---|
| CN | 101079026 B | 1/2011 |
| CN | 103617157 A | 3/2014 |
| CN | 107665189 A | 2/2018 |

OTHER PUBLICATIONS

Mell et al., "The NIST Definition of Cloud Computing", Recommendations of the National Institute of Standards and Technology, NIST Special Publication 800-145, Sep. 2011, 7 pages.

*Primary Examiner* — Akwasi M Sarpong
(74) *Attorney, Agent, or Firm* — Kristofer L. Haggerty

(57) ABSTRACT

Managing a computer database having a plurality of data entries, in a talent framework system. Generate a description text field of a data entry of the computer database by classifying sentences of one or more text streams stored in a text stream corpus. The classifying is performed by identifying, for a given sentence, whether the given sentence is relevant or irrelevant to a title text field of the data entry. K-means clustering can be used, where experimental data show that k=2 produces desirable classification outcomes.

21 Claims, 17 Drawing Sheets
(6 of 17 Drawing Sheet(s) Filed in Color)

800B

(56) References Cited

U.S. PATENT DOCUMENTS

| | | | |
|---|---|---|---|
| 2014/0067370 A1* | 3/2014 | Brun | G06F 40/211 |
| | | | 704/9 |
| 2014/0279637 A1* | 9/2014 | Rafaty | G06Q 10/1053 |
| | | | 705/321 |
| 2016/0140210 A1 | 5/2016 | Pendyala et al. | |
| 2017/0132569 A1* | 5/2017 | Parhi | G06N 20/00 |
| 2018/0052816 A1* | 2/2018 | Ma | G06F 40/30 |
| 2018/0123997 A1* | 5/2018 | Celedonia | H04L 67/306 |
| 2018/0357608 A1* | 12/2018 | Agrawal | G06F 16/437 |
| 2019/0163807 A1* | 5/2019 | Jain | G06F 16/245 |
| 2021/0150546 A1* | 5/2021 | Zhu | G06Q 30/0282 |
| 2021/0397662 A1* | 12/2021 | Sakakibara | G06F 16/906 |

\* cited by examiner

Summary of the logistic regression model

```
> summary(step.fit)

Call:
glm(formula = Y_N ~ verb_noun_ratio + Verb_1 + Pronoun_1 + Adjective +
    sum_of_3_ratios + number_1 + Noun + Conjunction + Conjunction_1 +
    con_Det_ratio, family = binomial(link = "logit"), data = POS_research,
    na.action = na.omit)

Deviance Residuals:
    Min       1Q   Median       3Q      Max
-2.68320 -0.13870  0.04983  0.32209  1.74333
```

Median deviance is close to 0

```
Coefficients:
                 Estimate Std. Error z value Pr(>|z|)
(Intercept)      -7.73601    5.33686  -1.450 0.147186
verb_noun_ratio -24.53338    7.26797  -3.373 0.000744 ***
Verb_1            4.84741    2.27146   2.134 0.032839 *
Pronoun_1        -1.74293    1.33000  -1.310 0.190035
Adjective        -0.37802    0.14655  -2.525 0.011574 *
sum_of_3_ratios  29.88631   10.20234   2.929 0.003397 **
number_1         -3.35577    1.82037  -1.844 0.065233 .
Noun              0.17445    0.08446   2.065 0.038885 *
Conjunction       0.72477    0.28118   2.578 0.009950 **
Conjunction_1    -7.40713    3.41404  -2.170 0.030037 *
con_Det_ratio     1.18546    0.58088   2.041 0.041670 *
---
Signif. codes:  0 '***' 0.001 '**' 0.01 '*' 0.05 '.' 0.1 ' ' 1
```

Significant features
Verb_noun_ratio is the most significant

```
(Dispersion parameter for binomial family taken to be 1)

Null deviance: 97.736  on 70  degrees of freedom
Residual deviance: 31.483  on 60  degrees of freedom
AIC: 53.483

Number of Fisher Scoring iterations: 7
```

Features based on stepwise regression (backward and forward)

Coefficient of determination is 67%

FIG. 7

Mount Everest description: Full Text

Demo

0  Mount Everest is Earths highest mountain above sea level, located in the Mahalangur Himal sub-range of the Himalayas. The international border between Nepal (Province No 1) and China (Tibet Autonomous Region) runs across its summit point. The current official elevation of 8848 m (29029 ft), recognized by China and Nepal, was established by a 1955 Indian survey and subsequently confirmed by a Chinese survey in 1975. In 2005, China remeasured the rock height of the mountain, with a result of 8844 m (29017 ft). There followed an argument between China and Nepal as to whether the official height should be the rock height (8844 m, China) or the snow height (8848 m, Nepal). In 2010, an agreement was reached by both sides that the height of Everest is 8848 m, and Nepal recognizes Chinas claim that the rock height of Everest is 8844 m. In 1865, Everest was given its official English name by the Royal Geographical Society, upon a recommendation by Andrew Waugh, the British Surveyor General of India. As there appeared to be several different local names, Waugh chose to name the mountain after his predecessor in the post, Sir George Everest, despite Everests objections. Mount Everest attracts many climbers, some of them highly experienced mountaineers. There are two main climbing routes, one approaching the summit from the southeast in Nepal (known as the "standard route") and the other from the north in Tibet. While not posing substantial technical climbing challenges on the standard route, Everest presents dangers such as altitude sickness, weather, and wind, as well as significant hazards from avalanches and the Khumbu Icefall. As of 2017, nearly 300 people have died on Everest, many of whose bodies remain on the mountain. The first recorded efforts to reach Everests summit were made by British mountaineers. As Nepal did not allow foreigners into the country at the time, the British made several attempts on the north ridge route from the Tibetan side. After the first reconnaissance expedition by the British in 1921 reached 7000 m (22970 ft) on the North Col, the 1922 expedition pushed the north ridge route up to 8320 m (27300 ft), marking the first time a human had climbed above 8000 m (26247 ft). Seven porters were killed in an avalanche on the descent from the North Col. The 1924 expedition resulted in one of the greatest mysteries on Everest to this day: George Mallory and Andrew Irvine made a final summit attempt on 8 June but never returned, sparking debate as to whether or not they were the first to reach the top. They had been spotted high on the mountain that day but disappeared in the clouds, never to be seen again, until Mallorys body was found in 1999 at 8155 m (26755 ft) on the north face. Tenzing Norgay and Edmund Hillary made the first official ascent of Everest in 1953, using the southeast ridge route. Norgay had reached 8595 m (28199 ft) the previous year as a member of the 1952 Swiss expedition. The Chinese mountaineering team of Wang Fuzhou, Gonpo, and Qu Yinhua made the first reported ascent of the peak from the north ridge on 25 May 1960.

FIG. 9 — 900

```
sentences_1[ 'sentence' ][sentences_1[ 'cluster' ]==1]
2      The current official elevation of 8848 m (29029 ft), recognized by China and Nepal, was established by a 19
55  Indian survey and subsequently confirmed by a Chinese survey in 1975.
6      As there appeared to be several different local names, Waugh chose to name the mountain after his predecess
or in the post, Sir George Everest, despite Everests objections.
7      Mount Everest attracts many climbers, some of them highly experienced mountaineers.
10     As of 2017, nearly 300 people have died on Everest, many of whose bodies remain on the mountain.
11     The first recorded efforts to reach Everests summit were made by British mountaineers.
15     The 1924 expedition resulted in one of the greatest mysteries on Everest to this day: George Mallory and An
drew Irvine made a final summit attempt on 8 June but never returned, sparking debate as to whether or not they w
ere the first to reach the top.
16     They had been spotted high on the mountain that day but disappeared in the clouds, never to be seen again,
until Mallorys body was found in 1999 at 8155 m (26755 ft) on the north face.
Name: sentence, dtype: object
```

FIG. 10

```
sentences_1['sentence']|sentences_1['cluster']]==2]
```

0    Mount Everest is Earths highest mountain above sea level, located in the Mahalangur Himal sub-range of the Himalayas.
1    The international border between Nepal (Province No 1) and China (Tibet Autonomous Region) runs across its summit point.
3    In 2005, China remeasured the rock height of the mountain, with a result of 8844 m (29017 ft).
4    There followed an argument between China and Nepal as to whether the official height should be the rock height (8844 m, China) or the snow height (8848 m, Nepal).
5    In 2010, an agreement was reached by both sides that the height of Everest is 8848 m, and Nepal recognizes Chinas claim that the rock height of Everest is 8844 m. In 1865, Everest was given its official English name by the Royal Geographical Society, upon a recommendation by Andrew Waugh, the British Surveyor General of India.
8    There are two main climbing routes, one approaching the summit from the southeast in Nepal (known as the "standard route") and the other from the north in Tibet.
9    While not posing substantial technical climbing challenges on the standard route, Everest presents dangers such as altitude sickness, weather, and wind, as well as significant hazards from avalanches and the Khumbu Icefall.
12    As Nepal did not allow foreigners into the country at the time, the British made several attempts on the north ridge route from the Tibetan side.
13    After the first reconnaissance expedition by the British in 1921 reached 7000 m (22970 ft) on the North Col, the 1922 expedition pushed the north ridge route up to 8320 m (27300 ft), marking the first time a human had climbed above 8000 m (26247 ft).
14    Seven porters were killed in an avalanche on the descent from the North Col.
17    Tenzing Norgay and Edmund Hillary made the first official ascent of Everest in 1953, using the southeast ridge route.
18    Norgay had reached 8595 m (28199 ft) the previous year as a member of the 1952 Swiss expedition.
19    The Chinese mountaineering team of Wang Fuzhou, Gonpo, and Qu Yinhua made the first reported ascent of the peak from the north ridge on 25 May 1960.

FIG. 11

EXTRACTING RELEVANT SENTENCES FROM TEXT CORPUS

BACKGROUND

The present invention relates generally to the field of artificial intelligence and machine learning, and more particularly to electronic natural language processing, with particular application to computerized talent frameworks.

The talent framework can be an important component of a multidimensional technological infrastructure needed to support growth in employment opportunities, the number of potential candidates who can fill them, and the need to develop candidate skills. Unique technological challenges arise as this infrastructure and the data it relies on grow.

There is, therefore, a need for an improved talent framework system.

SUMMARY

Embodiments of the present invention provide methods, systems, and computer program products for managing a computer database having a plurality of data entries.

In an embodiment, a method generates a description text field of a data entry of the computer database by classifying sentences of one or more text streams stored in a text stream corpus. The classifying includes identifying, for a given sentence, whether the given sentence is relevant or irrelevant to a title text field of the data entry.

In a related embodiment, the computer database includes a job profile library, wherein the data entry comprises a job profile, and wherein the job profile comprises a job title text field and a job description text field.

In a related embodiment, a text stream includes one or more paragraphs.

In a related embodiment, a text stream includes a document, and the document includes one or more paragraphs.

In a related embodiment, the method ingests one or more text streams from the text stream corpus.

In a related embodiment, the method extracts features from at least one sentence of at least one text stream ingested from the text stream corpus.

In a related embodiment, extracting features includes tagging the at least one sentence with parts-of-speech and a frequency of the parts-of-speech, using a natural language processing program.

In a related embodiment, extracting includes determining, for the at least one sentence, a percentage of tag frequency relative to a total number of parts-of-speech tags in the at least one sentence.

In a related embodiment, the percentage of tag frequency is determined for any one or more of: a verb part-of-speech tag relative to a noun part-of-speech tag; an adjective part-of-speech tag relative to a noun part-of-speech tag; and any other part-of-speech tag relative to any other part-of-speech tag.

In a related embodiment, identifying, for a given sentence, whether the given sentence is relevant or irrelevant to a title text field of the data entry, includes clustering the given sentence relative to a plurality of other sentences using an unsupervised learning process or a semi-supervised learning process.

In a related embodiment, identifying, for a given sentence, whether the given sentence is relevant or irrelevant to a title text field of the data entry, includes clustering the given sentence relative to a plurality of other sentences using k-means clustering.

In a related embodiment, a value of k is determined using silhouette score elbow methodology, Calinski Harabaz score elbow methodology, distortion score elbow methodology, or a combination of them.

In a related embodiment, k=2.

In a related embodiment, the method presents results of the classifying to a user and revises the classifying based on feedback received from the user.

In a related embodiment, revising the classifying based on feedback received from the user includes using at least one additional feature, removing at least one used feature, or both.

In a related embodiment, the clustering is performed to yield, for a cluster of relevant sentences, a mean noun-to-verb ratio of approximately 0.33 or less.

In a related embodiment, the clustering is performed to yield, for a cluster of average or below average sentences, a mean noun-to-verb ratio of approximately between 0.33 and 0.45.

In a related embodiment, the clustering is performed to yield, for a cluster of irrelevant sentences, a mean noun-to-verb ratio of approximately 0.45 or more.

In an embodiment, a computer program product for managing a computer database having a plurality of data entries, includes one or more tangible non-transitory storage media storing programming instructions for execution by a processor to perform a method. The programming instructions include instructions for generating a description text field of a data entry of the computer database by classifying sentences of one or more text streams stored in a text stream corpus. The classifying includes identifying, for a given sentence, whether the given sentence is relevant or irrelevant to a title text field of the data entry.

In an embodiment, a computer system for managing a computer database having a set of data entries, includes one or more processors, and one or more non-transitory tangible storage media storing programming instructions for execution by the one or more processors to perform a method. The programming instructions include instructions for generating a description text field of a data entry of the computer database by classifying sentences of one or more text streams stored in a text stream corpus. The classifying includes identifying, for a given sentence, whether the given sentence is relevant or irrelevant to a title text field of the data entry.

In an embodiment, a method for generating electronic natural language text using an input text and a text stream, is provided. The method clusters, using one or more ratios of parts-of-speech as features, a first plurality of sentences of the text stream as relevant to the input text and a second plurality of sentences of the text stream as irrelevant to the input text.

In a related embodiment, the clustering yields k clusters each having a mean ratio of parts-of-speech.

In a related embodiment, k=2.

In a related embodiment, a mean noun-to-verb ratio feature of sentences classified as relevant to the input text is approximately 0.33 or less.

BRIEF DESCRIPTION OF THE DRAWINGS

Statement pursuant under 37 CFR 1.84, Standards for drawings: The patent or application file contains at least one drawing executed in color. Copies of this patent or patent application publication with color drawing(s) will be provided by the Office upon request and payment of the necessary fee.

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, as follows.

FIG. 7 is an annotated summary 700 of an output of semi-supervised learning method 600 of FIG. 6, according to an embodiment of the invention.

FIG. 9 is a sample text 900 used to test unsupervised learning method 200 of FIG. 2 and semi-supervised learning method 600 of FIG. 6 to generic text, according to an embodiment of the invention.

FIG. 10 is a set of non-useful sentences 1000 extracted from sample text 900 of FIG. 9, according to an embodiment of the invention.

FIG. 11 is a set of non-useful sentences 1100 extracted from sample text 900 of FIG. 9, according to an embodiment of the invention.

DETAILED DESCRIPTION

Figure 1:
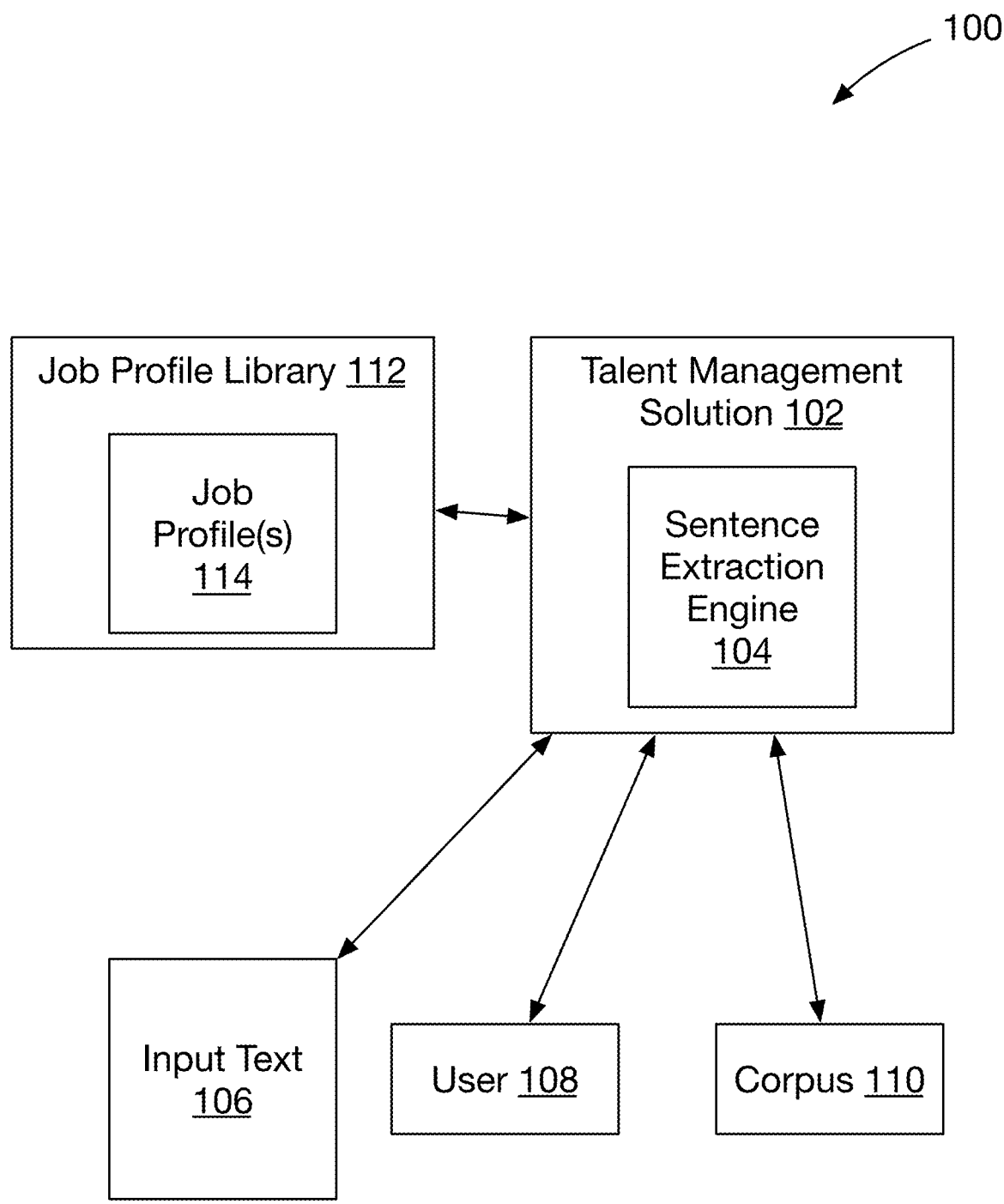
FIG. 1 is a functional block diagram of a computing environment 100 for a talent framework system 102, according to an embodiment of the invention.

A talent framework system generally refers to a set of one or more computer systems, computer program products, methods of their use, and data structures they store and operate on, in the field of talent management, education, and employment, among others. Many embodiments of Applicant's claimed invention are described with reference to a "talent framework system" to emphasize the technical and computer-centric nature of those embodiments. However, it shall be apparent to a person of ordinary skill in the art that the "talent framework" can also be a method or a computer program product.

An example of a talent framework system, according to an embodiment, is IBM® Watson® Talent Frameworks, which includes a library or dictionary of industry-specific job profiles, skills, competencies, and other information (all trademarks are the property of their respective owners; IBM® and Watson® Talent Frameworks are trademarks of International Business Machines Corporation, 1 Orchard Road, of Armonk, N.Y.). This and similar talent frameworks may define, for a given job profile, the key responsibilities, job level, core competencies, functional and technical skills for, interview questions, coaching tips, "smart" goals, prescriptive learning suggestions, and other information. This information may be in the form of electronic text data, non-text data, and metadata; it may be stored in one or more computer databases, embodied on a tangible non-transitory storage medium.

A talent framework system, according to embodiments of the invention, can be an important resource that human users, as well as other methods, systems, and computer program products (such as machine learning or other artificial intelligence solutions), can engage with for useful purposes. Access by these parties to the talent framework system can be made provided, for example, as a subscription-based service.

Technologically, user types or groups can be defined using a job profile library having one or more job profiles. The job profile library may be, in an embodiment, a computer database that stores job profile data in tabular format. Each job profile may be stored, for example, as a row in a table, such as a comma separated value (CSV) table. The table may have multiple columns, including, for example, a job identification (ID) column, a job title column, a job description column, job skills column, an interview question(s) column, and other data and metadata.

For example, consider an educational content provider. The educational content provider may be interested in "targeted engagement" with users; developing targeted content for a specific user type; or to target a specific user type for existing content.

One way to perform targeted engagement is to determine, for example, what skill set is required for a particular job profile, and to develop educational content (or curate existing content) that targets the required skillset. For example, if a particular job profile specifies a required skill or core competency as "proficiency in Programming Language A", then the educational content provider can create educational content that teaches Programming Language A at a proficiency specified by the job profile. Where the educational content provider has existing content that is tagged, for example, with the core competencies it develops, the educational content provider can map the content to the job profile(s) that requires it. A user who wishes to qualify for a particular job role, therefore, can easily find the educational content that are most relevant to that particular job role.

The educational content provider example is one of many; other users can also benefit from a talent framework system.

It should be noted that the need of talent framework systems exists for both large multinational enterprises and small employers alike; and entities that support them. A talent framework system, according to embodiments of the invention, augments human skills and ingenuity to enable users to perform computer-centric tasks (such as facilitating machine learning operations). In the context of embodiments of the claimed invention, therefore, the term "talent framework system" refers to software and hardware (methods, systems, and computer program products), and not abstract concepts, mathematical concepts, methods of organizing human activity, or mental processes. To the extent that any such concepts are involved, the claims nevertheless are directed to practical applications of them.

In at least some embodiments of the invention, a task of interest is to "manage" the job profile library. Managing the job profile library can include "processing" one or more job profiles (records) in the job profile library. The term "processing" refers to its ordinary meaning, and can include creating, duplicating, modifying, or deleting, a given job profile in the job profile library.

A particular technological challenge in the managing and processing functions is that the size of the databases and the amount of external data continues to grow, as new job roles are created, and as existing job roles become more nuanced. Manual management of the job profile library and manual processing of job profiles is practically impossible. Significantly, "automating" the process is non-trivial, and requires more than automating a known process steps on a computer using conventional means.

More specifically, a sub-task of interest in the managing and processing functions is, for a given job profile, to generate electronic job description text from a text stream. The process generally involves, for a given job profile and a corresponding job title, extracting useful sentences from a corpus of text streams, where a sentence is useful if it accurately describes the corresponding job title. Recall that this job title text may be for an entirely new job role, for which no existing job description text exists. Absent use of embodiments of the invention, creating the job profile and its description text would require manually specifying the job title text and manually creating a job description text. The challenge is self-evident when one considers the thousands (and growing) number of job roles.

Matching the job title to text streams (for purpose of extracting useful sentences to include in a corresponding job description) is a non-trivial technical challenge, because of how data is stored and processed on a computer (a problem that does not exist in a manual, human-only approach). A reason for this challenge, appreciated by the inventor of the claimed invention, is an inherent imbalance between the length and nature of the job title text on the one hand, and text streams used to generate a corresponding job description, on the other.

For example, the talent framework system may present the user with a set of predefined job roles, and the user selects one of them for further processing; or the user creates a new job profile; these may be called "input text". Matching this new job title text to job description text (sentences, required skills, etc.) that is already stored in a reference corpus of job description texts can be difficult, because the input text may have text that is short and to the point (for example only a few words); whereas job descriptions in the reference corpus may have text streams that include large amounts of text with a potentially large number of sentences, many of which may be non-essential or irrelevant to the input text.

A consequence of the imbalance between the length or size of the input text and the text streams is that attempts to match them yields too many false positives and too many false negatives. For example, an electronic job title is matched to sentences when it should not be; or there is no match where there should have been a match (for example, this may be the case using a term frequency inverse document frequency (TF-IDF) approach). There exists, therefore, a class of this mismatch that can be traced to the imbalance between the sizes and details of the records to be matched. In technical terms, addressing this issue may require, for false positives, reducing a job matching threshold value (to reduce matches and to reduce false positives); whereas addressing the issue for false negatives requires an increase in the job matching threshold value (to increase matches and to reduce false negatives). These opposing solutions make it difficult to arrive at an optimal solution; the job description is either missing information (which could have been gathered, using embodiments of the claimed invention) or has bad information (which could have been discarded, using embodiments of the claimed invention).

There is, therefore, a need for consistent extraction of useful sentences from job text stored in a corpus of text of job descriptions, for use in the particular job profile that the user is attempting to process or manage; such that useful sentences are included and non-useful sentences are excluded. The solution may improve text matching scores and may be used in a semantic-based or non-semantic-based matching process.

The inventor of the claimed invention has uniquely tested, observed, and discovered, upon repeated testing on several data sets including job texts specifying responsibilities and other description, that there are patterns in the forms of ratios between different parts of speech (PoS) tags in these texts. More specifically, the tested, observed, and discovered ratios, together with other standardized PoS scores, can be used as features that help distinguish between useful and non-useful (or relevant versus irrelevant sentences, or good versus bad sentences) during the matching process.

Uniquely, PoS tags and their interactions have not previously been used to distinguish useful sentences from non-useful sentences in processing job description texts.

In accordance with an embodiment of the invention, the talent framework system generally finds a fixed range of ratios between PoS elements in a relevant sentence versus an irrelevant sentence and keeps only those sentences deemed important or relevant. The solution is validated through a machine learning approach using a semi-supervised or unsupervised learning process. The solution is improved based on evaluations of models generated by the machine learning approach. As such, there are two approaches to this process, as described below.

Figure 2:
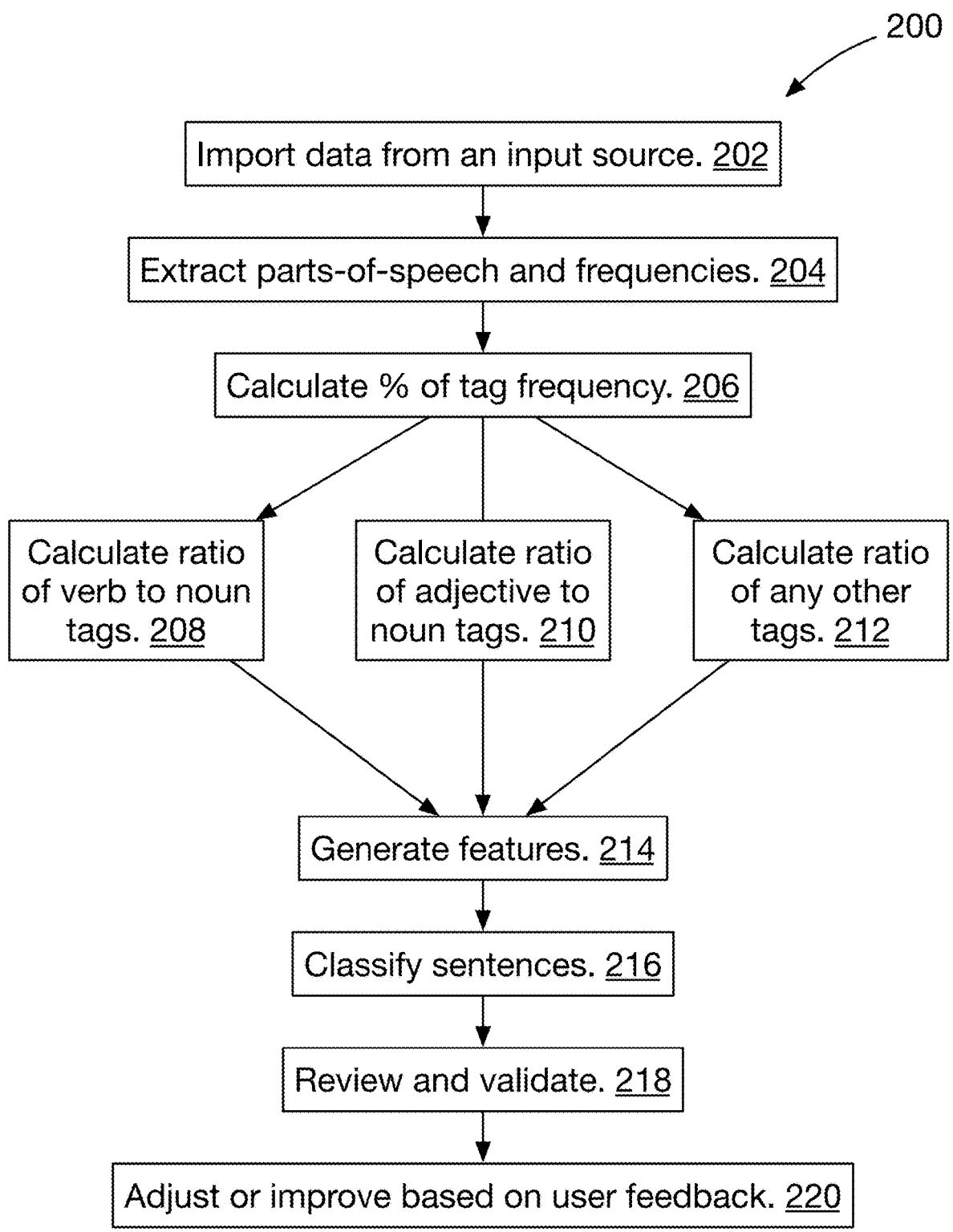
FIG. 2 is a flowchart of an unsupervised learning method 200 for use by talent framework system 102 of FIG. 1, according to an embodiment of the invention.

In a first approach illustrated in FIG. 2, according to an embodiment of the invention, an unsupervised learning process is provided. One or more stages or steps of the unsupervised learning process may include: ingestion, pre-processing, feature creation, K-means clustering for segregating two clusters, classifying sentences as useful and non-useful based on an average cluster score, retaining only useful sentences, further processing based on specific user needs, evolving training set data over time, and improving predictions.

Figure 5:
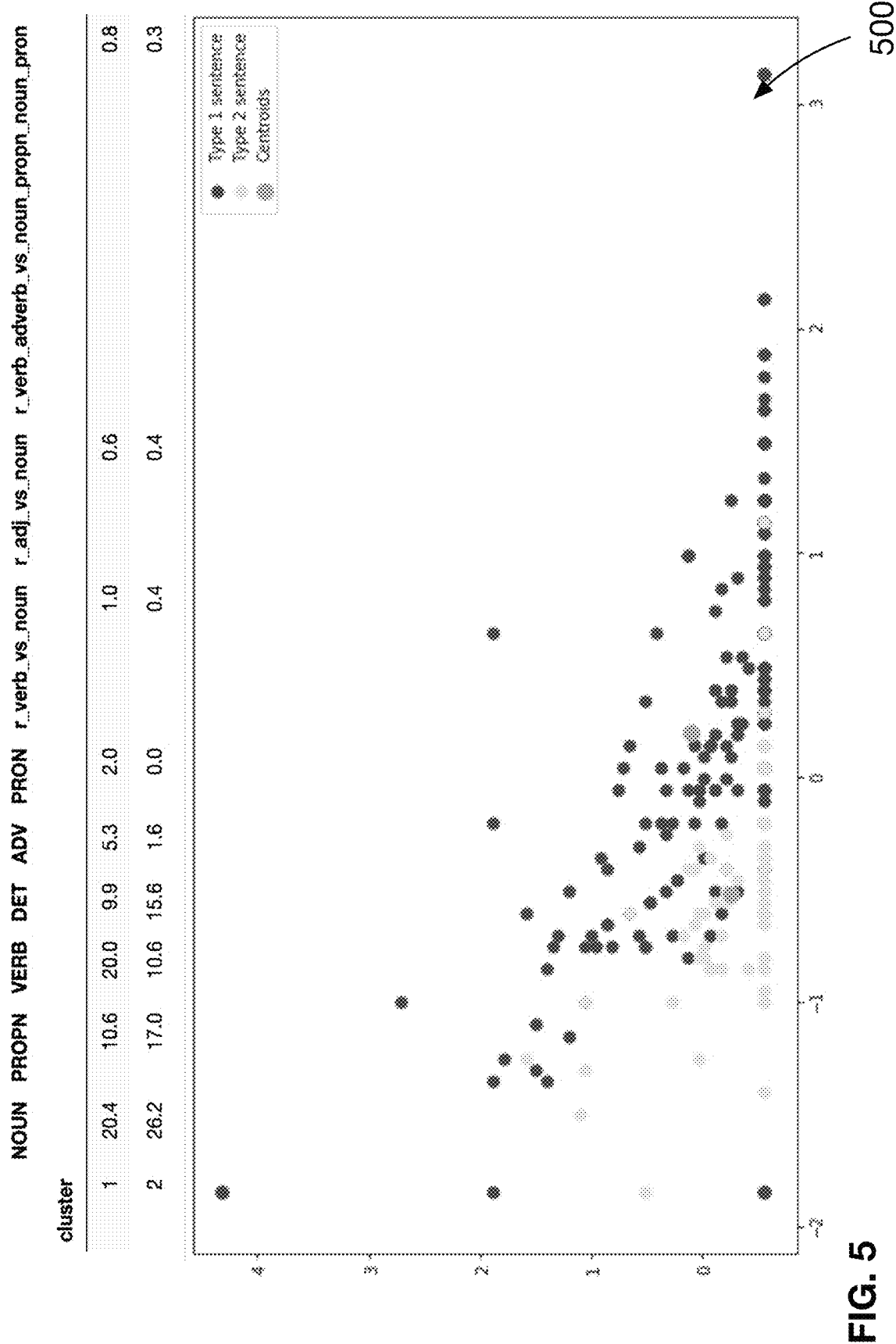
FIG. 5 is a plotted graph 500 for use in unsupervised learning method 200 of FIG. 2 to perform k-means clustering using cluster plots and average cutoffs, according to an embodiment of the invention.

In a second approach, according to an embodiment of the invention illustrated in FIG. 5, a semi-supervised learning process is provided. One or more steps of the supervised learning process may include: ingestion, pre-processing, feature creation, manual tagging of a training set, classifying sentences as useful and non-useful based on various machine learning algorithms (using ensemble or stacking methods), retaining only useful sentences, further processing based on specific user needs, evolving training set data over time, and improving predictions.

A difference between the first and second approaches is that the first uses k-means clustering for segregating two clusters, and classifies sentences as useful and non-useful based on an average cluster score, whereas the second approach uses manual tagging of a training set, and classifies sentences as useful and non-useful based on various machine learning algorithms (using ensemble or stacking methods).

According to an embodiment of the invention, additional details of the first approach (unsupervised learning; illustrated in FIG. 2) is provided in terms of functions performed by a sentence extractor engine. The process includes steps of importing data including job description text, extracting PoS tags from the input data (using any tagging process known in the art, such as the Python® Natural Language Toolkit, "NLTK"; "Python" is a registered trademark of the Python Software Foundation, "PSF"), counting the percentage of tags in the sentences of the job text, calculating a ratio of verbs to nouns (VtoN), calculating a ratio of adjectives to nouns (AtoN), calculating other ratios, creating additional features, classifying sentences as relevant or irrelevant using k-means clustering based on available features, reviewing and validating results (for example, using subject matter expert review), and improving the output based on the validations.

These and other embodiments of the claimed invention will now be described in more detail, in connection with the various Figures.

FIG. 1 is a functional block diagram of a computing environment 100 for a talent framework system 102, according to an embodiment of the invention.

Referring now to FIG. 1, computing environment 100 includes one or more operatively connected computing devices, each of which generally may include components as described in connection with FIGS. 14-16. In the depicted embodiment, computing environment 100 includes talent framework system 102 (which in turn includes sentence extraction engine 104) which generally receives input text 106 (for example, via user 108) and loads data from and stores data to job profile library 112 (including job profile(s) 114) and from/to a job description text corpus 110 (corpus 110, or text stream corpus 110).

In the depicted environment, talent framework system 102 is computer program having program instructions embodied on one or more tangible and non-transitory storage media operatively connected to one or more computing devices (not explicitly shown), including one or more processors. Program instructions of talent framework system 102 are executable by the one or more processors to perform one or more methods, according to embodiments of the invention (for example, to perform unsupervised learning method 200 of FIG. 2 or semi-supervised learning method 600 of FIG. 6, among other methods).

Certain programming instructions of talent framework system 102 are described in reference to a sentence extraction engine 104, for illustration purposes. Sentence extraction engine 104 itself may be a program or subroutine of talent framework system 102. Talent framework system 102 and/or sentence extraction engine 104 generally may receive input text 106 (for example, from user 108 or as provided by an automated process). Input text 106 may be, for example, an electronic job profile 114 and/or a job title that user 108 wishes to create a job description for, using a minimal set of data. Talent framework system 102 enables user 108, in this use-case, to generate a fully formulated electronic job profile 114 without user 108 having to manually conceive of and generate the job description or its other data (such as core competencies). Instead, sentence extraction engine 104 generally uses the received input text 106 to query corpus 110 for relevant sentences contained in one or more stored text streams. The querying function of talent framework system 102 may be used to query electronic text or other data that defines a job description, required skills, interview questions, or any other data that directly or indirectly is needed or desirable for generating dynamic and automated creation or curation (e.g., editing/modifying) of an electronic job post; or to facilitate a candidate assessment process (for example, by providing interview questions).

With continued reference to FIG. 1, corpus 110 may a single database or a set of databases; for ease of reference, it is described here as a single computer database. Corpus 110 stores a ready-to-use job profiles library 112 of job profiles 114 and associated skills for thousands of general and industry-specific jobs, covering thousands of skills. A given profile may include a job description, one or more key responsibilities, and one or more associated skills, among other data. Corpus 110 also stores interview questions, coaching tips, development goals, and perspective learning suggestions for one or more competency levels. Job profiles 114 may be customizable and deployable across a wide range of human-resources applications across enterprise providers.

FIG. 2 is a flowchart of an unsupervised learning method 200 for use by talent framework system 102 of FIG. 1, according to an embodiment of the invention. Method 200 may be implemented by executing, using one or more processors of one or more computing devices, a set of programming instructions of talent framework system 102 that are stored on one or more tangible storage devices.

Referring now to FIGS. 1 and 2, talent framework system 102 imports (step 202) data from an input source; for example, in the form of input text 106. The process of importing may also be referred to as "loading", "receiving", or "ingesting", and may include receiving an instruction from a user or an automated process to load input text 106 from a data store.

The process of importing (step 202) may also include, in an embodiment, importing data from corpus 110 for use in matching text stored in corpus 110 to input text 106. For example, talent framework system 102 loads a one-column dataset, where each row of the one-column dataset is or includes a text segment, text snippet, or text paragraph, or a document.

Talent framework system 102 extracts (step 204) (for example, via sentence extraction engine 104), parts-of-speech (PoS) tags and their frequencies for at least one entry in the dataset imported (step 202) from corpus 110. In one embodiment, talent framework system 102 extracts (step 204) a PoS frequency for tags like noun, pronoun, adjective, adverb, verb, or any other PoS grammatical tag, for at least one sentence (and possibly more, even all sentences) in at least one document (and possibly more, even all documents) in the one-column dataset imported (step 202). In another embodiment, talent framework system 102 performs the same extraction (step 204) with respect to one or more (and possibly all) paragraphs in the one-column dataset.

The extraction process (step 204) may be carried out in other ways as well, depending on the organization of the input text 106 dataset.

With continued reference to FIGS. 1 and 2, talent framework system 102 calculates (step 206) a percentage of tag frequency for at least one particular PoS tag relative to a total number of PoS tags; this may be performed, in one embodiment, for each sentence in a row (where the row includes a paragraph) or for each document in a row (where the row includes a document) of the one-column dataset imported (step 202). For example, if the total number of PoS tags in a sentence are 35, and 20 of them are noun PoS tags, then the ratio of noun tags in that sentence is 20:35, or approximately 0.57.

Talent framework system 102 calculates (step 208) a ratio of verb PoS tags to noun PoS tags ("VtoN") in each sentence under analysis.

Talent framework system 102 calculates (step 210) a ratio of adjective PoS tags to noun PoS ("AtoN") tags in each sentence under analysis.

Talent framework system 102 calculates (step 212) any other ratio of PoS tags in each sentence under analysis as may be desired.

Talent framework system 102 creates (generates) (step 214) one or more other text-related features (i.e., "other" relative to any ratios calculated at steps 208, 210, or 212) that are desirable for use in classifying the text imported (step 202). Experimental results have shown that this step (step 214) is optional. However, it should be noted that no single step of method 200 is necessary to the practice of embodiments of the invention unless otherwise specified; and in any event, embodiments of the invention are defined by the claims.

Talent framework system 102 classifies (step 216) sentences of the extracted dataset (step 202) as "good" or "bad" sentences; i.e., sentences that are desirable or undesirable matches to input text 106. For example, a set of "good" sentences may be suitable for use in a dynamic and automated generation of a job post based on a selection of a seed job title text by user 108 (and communicated to talent framework system 102 to receive "good" sentences to populate the job profile 114). As another example, a set of "good" sentences may be suitable interview questions for a job posting that user 108 has identified. "Bad" sentences, on the other hand, are not good matches and may be filtered out from communication to the user or from inclusion in the job profile 114.

In an embodiment, the function of classifying (step 216) is performed using k-means clustering or any other type of unsupervised learning to generate sentence clusters. In an embodiment, and as determined by experimental results, a particularly useful choice is k=2.

Talent framework system 102 may provide training, review, and validation (step 218) functions via any automated or manual means (such as communication of results to user 108 via a graphical user interface).

Talent framework system 102 may adjust or improve (step 220) its classification based on results of the review and validation (step 218) functions (performed automatically or with manual input from user 108). For example, additional ratios may be added or removed as features in the classifying (adding or removing ratios at step 214). The adjustments or improvements (step 220) create cluster boundaries that help better distinguish a "good" sentence from a "bad" sentence.

Figure 3:
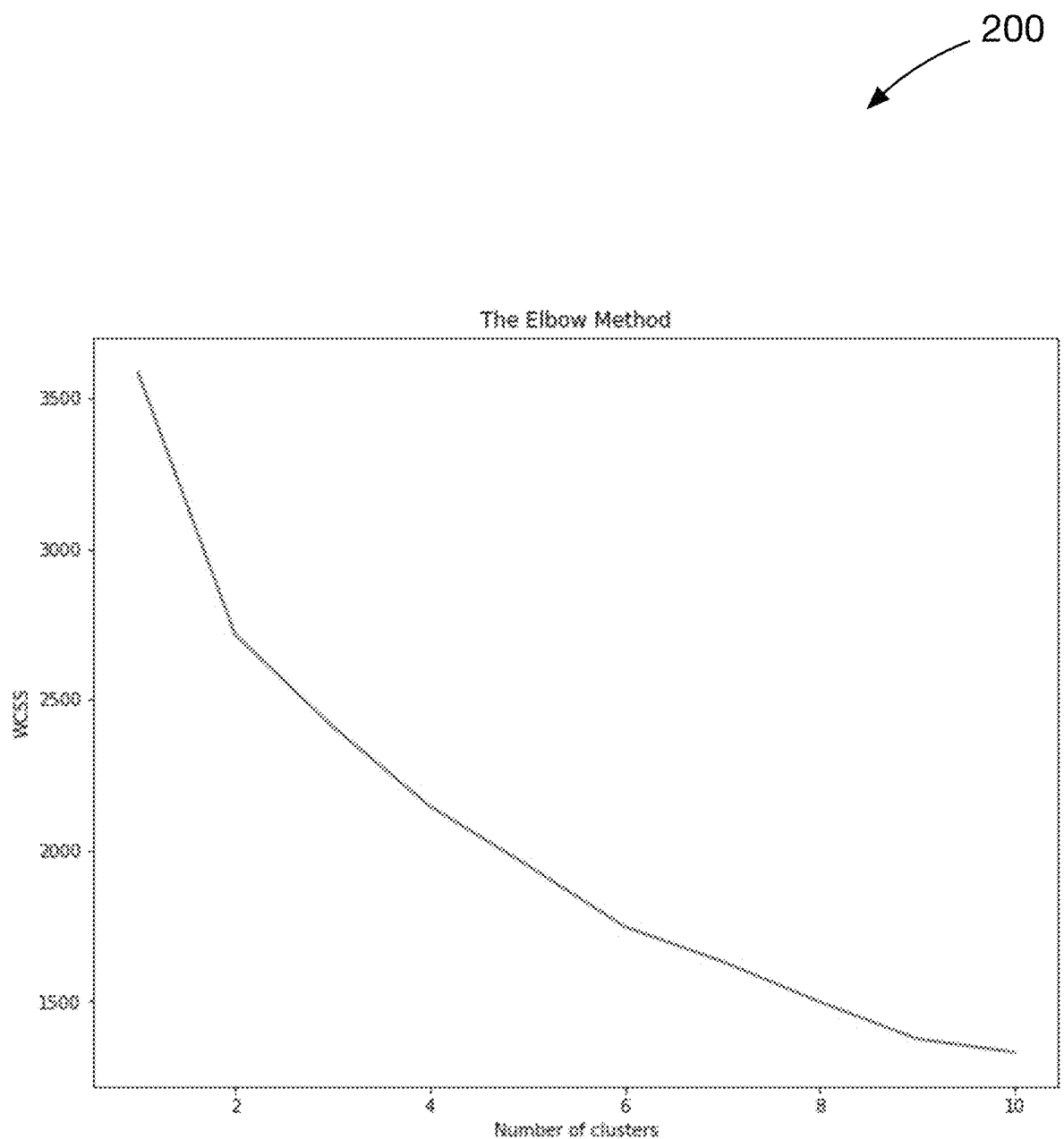
FIG. 3 is a plotted graph 300 for use in unsupervised learning method 200 of FIG. 2 to perform k-means clustering using the elbow method, according to an embodiment of the invention.

FIG. 3 is a plotted graph 300 for use in unsupervised learning method 200 of FIG. 2 to perform k-means clustering using the elbow method, according to an embodiment of the invention. In plotted graph 300, the x-axis represents the number of clusters, and the y-axis represents WCSS(x) values (within-cluster sums of squares), where x is the number of clusters considered on the x-axis.

Referring now to FIGS. 1 and 3, the "elbow method" is one useful method of k-means clustering that allows user 108 to find optimal sentence clusters; i.e., the optimal value of k can be determined using the elbow method as applied to plotted graph 300. Experiments by the inventor of the claimed invention have shown this optimal value to be 2, in a preferred embodiment of the claimed invention. In these experiments, a cluster range between 1 to 10 clusters was selected. The inventor observed that in almost all cases, the number of clusters suggested by the elbow method was 2; i.e., the sharpest ben in plotted graph 300 was at 2.

Figure 4A:
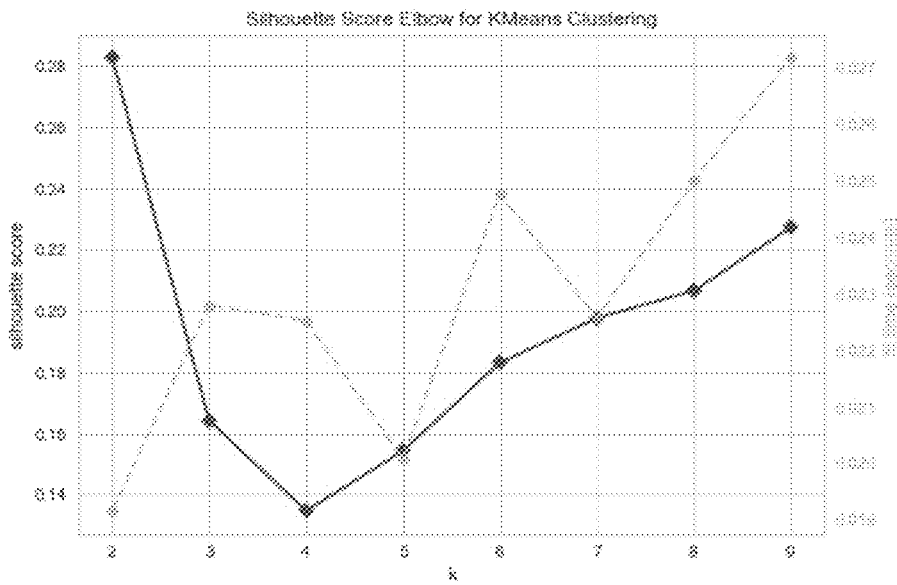
FIG. 4A is a plotted graph 400A for use in unsupervised learning method 200 of FIG. 2 to perform k-means clustering using the silhouette score elbow method, according to an embodiment of the invention.

FIG. 4A is a plotted graph 400A for use in unsupervised learning method 200 of FIG. 2 to perform k-means clustering using the silhouette score elbow method, according to an embodiment of the invention. Using the silhouette score elbow method serves as an additional validation of experimental results that the inventor evaluated using plotted graph 300 (FIG. 3), and establishes that the discovered value of k=2, according to a preferred embodiment, is not a coincidence. Rather, it is a non-trivial and non-obvious choice identified by experimental data.

Referring now to FIGS. 1 and 4A, plotted graph 400A and the silhouette score elbow method is an alternative the elbow method alone (FIG. 3 and plotted graph 300) are deemed inefficient. In plotted graph 400A, the x-axis represents the number of clusters and the y-axis represents the corresponding silhouette score. A study of plotted graph 400A establishes that the silhouette score is highest for k=2.

Figure 4B:
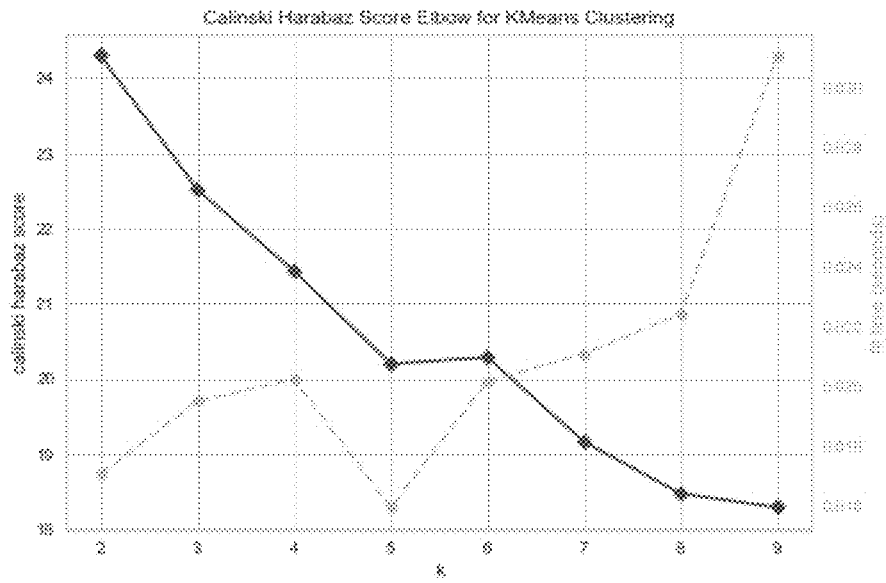
FIG. 4B is a plotted graph 400B for use in unsupervised learning method 200 of FIG. 2 to perform k-means clustering using the Calinski Harabaz score elbow method, according to an embodiment of the invention.

FIG. 4B is a plotted graph 400B for use in unsupervised learning method 200 of FIG. 2 to perform k-means clustering using the Calinski Harabaz score elbow method, according to an embodiment of the invention. Using the Calinski Harabaz score elbow method serves as an additional validation of experimental results that the inventor evaluated using plotted graph 300 (FIG. 3), and establishes that the discovered value of k=2, according to a preferred embodiment, is not a coincidence. Rather, it is a non-trivial and non-obvious choice identified by experimental data.

Referring now to FIGS. 1 and 4B, plotted graph 400B and the Calinski Harabaz score elbow method is an alternative to the elbow method alone (FIG. 3 and plotted graph 300) are deemed inefficient. In plotted graph 400B, the x-axis represents the number of clusters and the y-axis represents the corresponding Calinski Harabaz score. A study of plotted graph 400B establishes that the Calinski Harabaz score is highest for k=2.

Figure 4C:
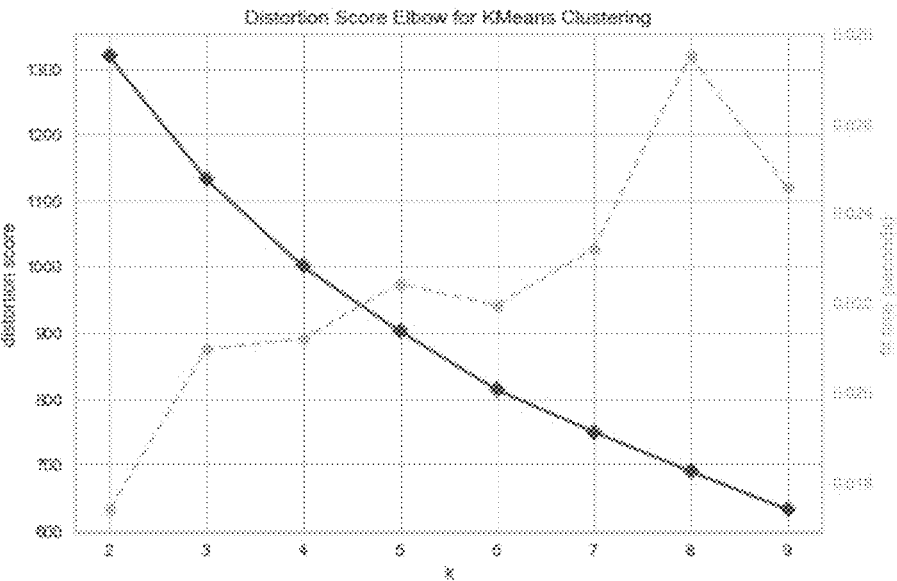
FIG. 4C is a plotted graph 400C for use in unsupervised learning method 200 of FIG. 2 to perform k-means clustering using the distortion score elbow method, according to an embodiment of the invention.

FIG. 4C is a plotted graph 400C for use in unsupervised learning method 200 of FIG. 2 to perform k-means clustering using the distortion score elbow method, according to an embodiment of the invention. Using the distortion score elbow method serves as an additional validation of experimental results that the inventor evaluated using plotted graph 300 (FIG. 3), and establishes that the discovered value of k=2, according to a preferred embodiment, is not a coincidence. Rather, it is a non-trivial and non-obvious choice identified by experimental data.

Referring now to FIGS. 1 and 4C, plotted graph 400C and the distortion score elbow method is an alternative to the elbow method alone (FIG. 3 and plotted graph 300) are deemed inefficient. In plotted graph 400C, the x-axis represents the number of clusters and the y-axis represents the corresponding distortion score. A study of plotted graph 400C establishes that the distortion score is highest for k=2.

Referring again to FIGS. 1-4C, the specific choice of k in the classifying step (step 216) or the review and validate step (step 218) or adjustments and improvements (step 220) may be done using data available in the plotted graphs of FIGS. 3 and 4A-C. For example, if k is set to 3 at step 216; and thereafter any plotted graph of FIG. 3 or 4A-C indicates a better selection of k, then k may be reset to a new value, and steps of method 200 may be iteratively performed to achieve a superior classification of "good" versus "bad" (or relevant versus irrelevant) sentences. The review and validate (step 218) functions can be provided using, for example, a user interface, such as a graphical user interface (GUI).

In an illustrative scenario, if two or one out of three tests show a peak (this is at least theoretically possible), then the overall quality of sentences in the imported (step 202) dataset may be low; i.e., there may be "junk" words in the extracted sentences, or the sentences are incorrect; or there are misspelled words; or other quality features that influence PoS extraction (step 204), which in turn affects ratio calculations (step 206, step 208, step 210, step 212, step 214).

FIG. 5 is a plotted graph 500 for use in unsupervised learning method 200 of FIG. 2 to perform k-means clustering using cluster plots and average cutoffs, according to an embodiment of the invention. Plotted graph 500 depicts two sets of sentences (Type 1 sentences in red color; and Type 2 sentences in yellow color), two centroid sentences in orange, and outlier sentences.

Plotted graph 500 has two centroids. Plotted graph 500 verifies the inventor's experimental data established that k=2 is a good choice for grouping sentences of imported (step 202 of method 200), according to a preferred embodiment of the invention. There may be some outliers that cannot be classified with complete certainty; however, the number outliers can be reduced by applying some rules to the classification process (step 216 of method 200).

Plotted graph 500 demonstrates that various PoS and their ratios are helpful in distinguishing sentences into two clusters. According to a preferred embodiment of the invention: a good cluster with a mean noun-to-verb ratio of approximately 0.33 or below will identify "good" sentences; a good cluster with a mean noun-to-verb ratio >0.33 and <=0.45 will identify average or below average sentences; and a good cluster with a mean noun-to-verb ratio >0.45 will have below average sentences. These will show up in validation plots and cluster means analysis as well.

Figure 6:
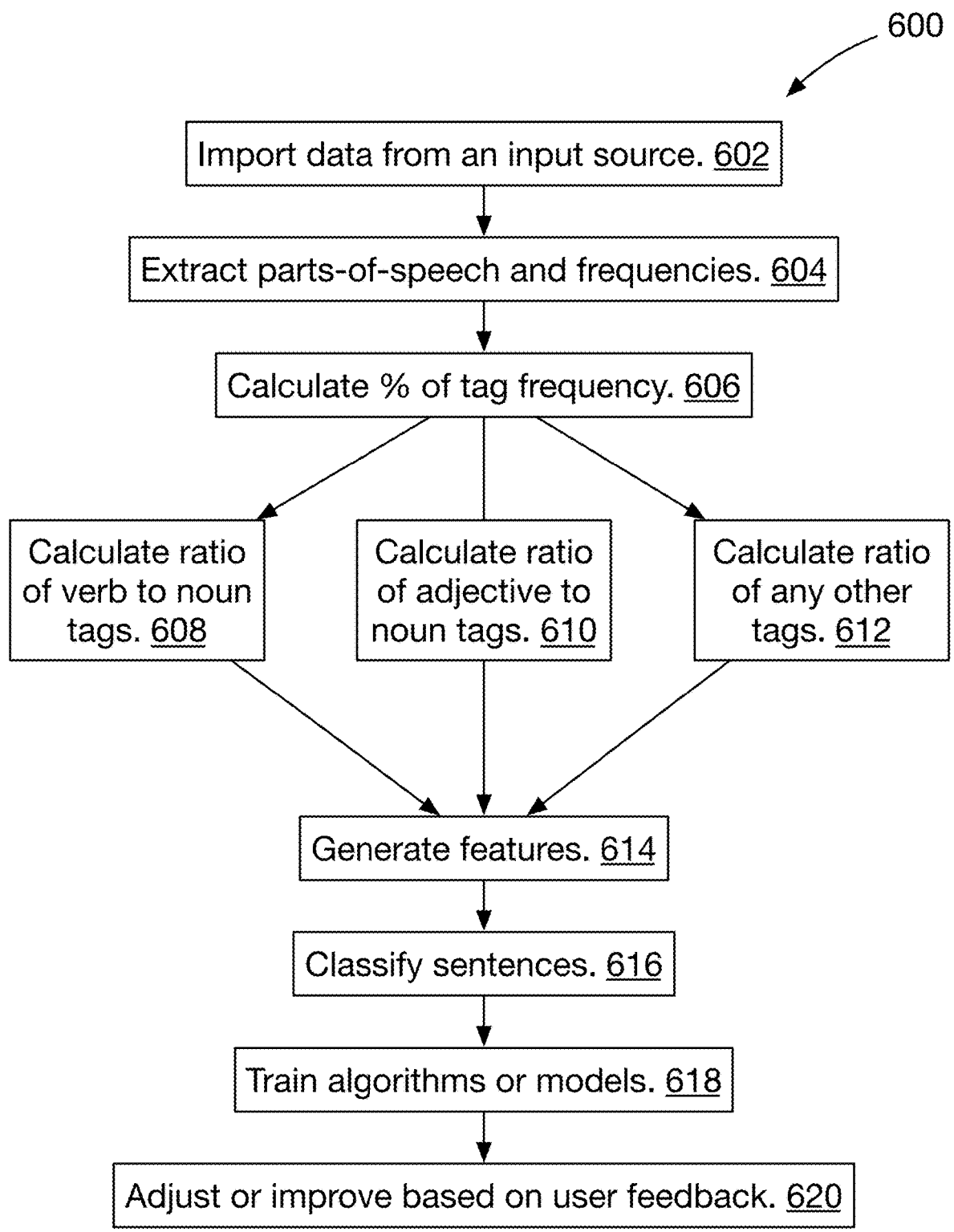
FIG. 6 is a flowchart of a semi-supervised learning method 600 for use by talent framework system 102 of FIG. 1, according to an embodiment of the invention.

FIG. 6 is a flowchart of a semi-supervised learning method 600 for use by talent framework system 102 of FIG. 1, according to an embodiment of the invention. Method 600 may be implemented by executing, using one or more processors of one or more computing devices, a set of programming instructions of talent framework system 102 that are stored on one or more tangible storage devices. Some steps of method 600 may be similar to some steps to method 200 (FIG. 2).

Referring now to FIGS. 1 and 6, talent framework system 102 imports (step 602) data from an input source; for example, in the form of input text 106. The process of importing may also be referred to as "loading", "receiving", or "ingesting", and may include receiving an instruction from a user or an automated process to load input text 106 from a data store.

The process of importing (step 602) may also include, in an embodiment, importing data from corpus 110 for use in matching text stored in corpus 110 to input text 106. For example, talent framework system 102 loads a one-column dataset, where each row of the one-column dataset is or includes a text segment, text snippet, or text paragraph, or a document.

Talent framework system 102 extracts (step 604) (for example, via sentence extraction engine 104), parts-of-speech (PoS) tags and their frequencies for at least one entry in the dataset imported (step 602) from corpus 110. In one embodiment, talent framework system 102 extracts (step 604) a PoS frequency for tags like noun, pronoun, adjective, adverb, verb, or any other PoS grammatical tag, for at least one sentence (and possibly more, even all sentences) in at least one document (and possibly more, even all documents) in the one-column dataset imported (step 602). In another embodiment, talent framework system 102 performs the same extraction (step 604) with respect to one or more (and possibly all) paragraphs in the one-column dataset.

The extraction process (step 604) may be carried out in other ways as well, depending on the organization of the input text 106 dataset.

With continued reference to FIGS. 1 and 6, talent framework system 102 calculates (step 606) a percentage of tag frequency for at least one particular PoS tag relative to a total number of PoS tags; this may be performed, in one embodiment, for each sentence in a row (where the row includes a paragraph) or for each document in a row (where the row includes a document) of the one-column dataset imported (step 602). For example, if the total number of PoS tags in a sentence are 35, and 20 of them are noun PoS tags, then the ratio of noun tags in that sentence is 20:35, or approximately 0.57.

Talent framework system 102 calculates (step 608) a ratio of verb PoS tags to noun PoS tags ("VtoN") in each sentence under analysis.

Talent framework system 102 calculates (step 610) a ratio of adjective PoS tags to noun PoS ("AtoN") tags in each sentence under analysis.

Talent framework system 102 calculates (step 612) any other ratio of PoS tags in each sentence under analysis as may be desired.

Talent framework system 102 creates (generates) (step 614) one or more other text-related features (i.e., "other" relative to any ratios calculated at steps 608, 610, or 612) that are desirable for use in classifying the text imported (step 602). Experimental results have shown that this step (step 614) is optional. However, it should be noted that no single step of method 600 is necessary to the practice of embodiments of the invention unless otherwise specified; and in any event, embodiments of the invention are defined by the claims.

Talent framework system 102 classifies (step 616) sentences of the extracted dataset (step 602) as "good" or "bad" sentences; i.e., sentences that are desirable or undesirable matches to input text 106. For example, a set of "good" sentences may be suitable for use in a dynamic and automated generation of a job post based on a selection of a seed job post or seed text by user 108 (and communicated to talent framework system 102 to receive "good" sentences to populate the job post). As another example, a set of "good" sentences may be suitable interview questions for a job posting that user 108 has identified. "Bad" sentences, on the other hand, are not good matches and may be filtered out from communication to the user.

In an embodiment, the function of classifying (step 616) is performed using a manual classification process; thereby the process is semi-supervised. Contrast this semi-supervised approach with the unsupervised approach illustrated in FIG. 2, where classifying (step 216 of method 200) uses k-means clustering or any other type of unsupervised learning to generate sentence clusters.

Talent framework system 102 may train, review, and validate (step 618) one or more machine learning algorithms or models to learn from the manual classifying (step 616) to build machine learning models that can be used to automate subsequent classifications (subsequent iterations of step 616, or other classification steps such as step 216 of method 200).

Talent framework system 102 may adjust or improve (step 620) its classification based on results of the review and validation (step 618) functions (performed automatically or with manual input from user 108). For example, additional ratios may be added or removed as features in the classifying (adding or removing ratios at step 614). The adjustments or improvements (step 620) create cluster boundaries that help better distinguish a "good" sentence from a "bad" sentence.

Referring now generally to FIGS. 1, 2, and 6, a difference between the described unsupervised and semi-supervised approaches is as follows. In the unsupervised learning approach, classification (step 216) is performed using k-means clustering; whereas in the semi-supervised approach, a training dataset is first manually generated via manually classifying (step 616), i.e., clustering, sentences in the input dataset, and then training (step 618) machine learning models using one or more machine learning algorithms to further classify sentences or refine existing classifications. Tests by the inventor of the claimed invention, using both approaches, has produced comparable results. In some embodiments, the unsupervised approach may be preferable as it reduces the need for manual intervention by a human reviewer; which in turn may add undesirable cost and may introduce undesirable bias.

FIG. 7 is an annotated summary 700 of an output of semi-supervised learning method 600 of FIG. 6, according to an embodiment of the invention. Annotated summary 700 is based on executing method 600 using an input dataset having seventy (70) sentences.

Referring now to FIGS. 1, 6, and 7, the seventy sentences were classified (step 616) as '0' or '1' ("good or "bad"). Various features based on PoS tags were also created (step 614). Some of these various features were different from other tests the inventor of the claimed invention carried out using k-means clustering (method 200 of FIG. 2), in order to cross validate the hypotheses and the relative performance of the two methods (method 200 relative to method 600). The sentences whose processing yielded annotated summary 700 were also different from those used to evaluate, in some tests, method 200 (FIG. 2). A logistic regression model was used to check the significance of the selected features. Additionally, clustering was used on all features, except the cluster feature, to verify whether the semi-supervised approach yields a k=2 optimal cluster size, as was the case in the unsupervised approach.

In the logistic regression model shown in annotated summary 700, it can be seeing that 9 out of 10 features show up as significant in that model, and that the most significant feature is the verb-to-noun ratio. The coefficient of determination is roughly 68% (calculated as (97.7−31.5) ÷97.7=67.6%). This is a good result, especially when considering that the sample dataset contained only 70 sentences in this test.

Figure 8C:
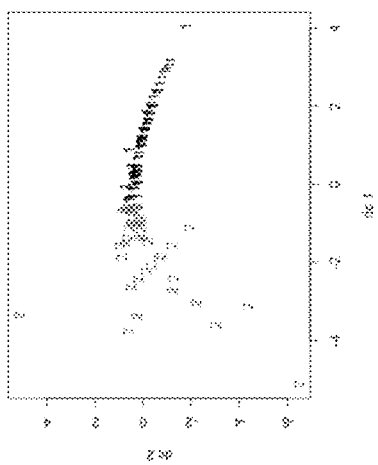
FIG. 8C is a cluster plot 800C generated using semi-supervised learning method 600 of FIG. 6, according to an embodiment of the invention.
Figure 8B:
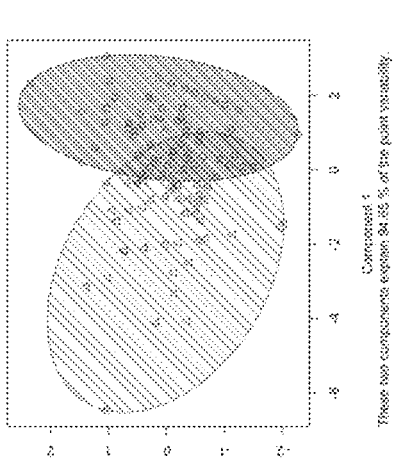
FIG. 8B is a cluster plot 800B generated using semi-supervised learning method 600 of FIG. 6, according to an embodiment of the invention.
Figure 8A:
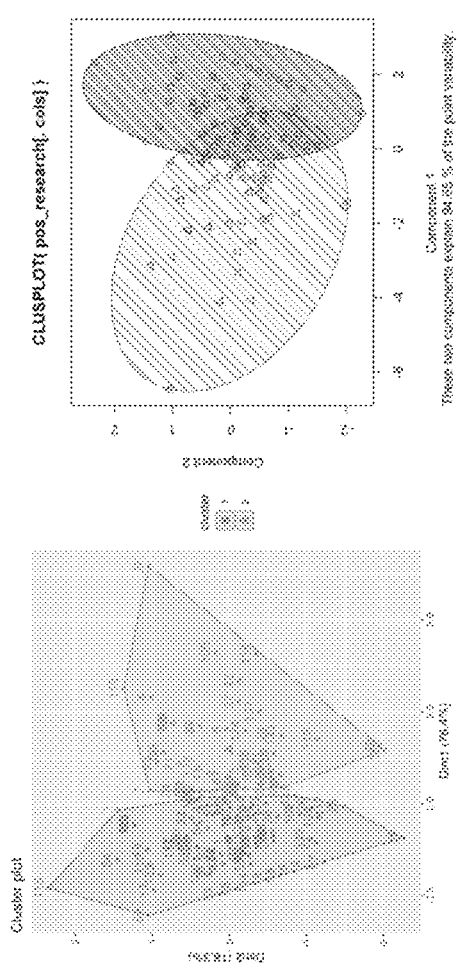
FIG. 8A is a cluster plot 800A generated using semi-supervised learning method 600 of FIG. 6, according to an embodiment of the invention.

FIG. 8A is a cluster plot 800A generated using semi-supervised learning method 600 of FIG. 6, according to an embodiment of the invention.

FIG. 8B is a cluster plot 800B generated using semi-supervised learning method 600 of FIG. 6, according to an embodiment of the invention.

FIG. 8C is a cluster plot 800C generated using semi-supervised learning method 600 of FIG. 6, according to an embodiment of the invention.

Referring now to FIGS. 1, 6, 7, and 8A-C, it can be seen from the clustering results depicted in FIGS. 8A-C that cluster boundaries, in each case, are clearly distinguished, even for a relatively small test of seventy sentences and three features. In these cases, three libraries were used for clustering, and three features were used based on the significance in the model: non ratio; verb ratio; and verb-to-noun ratio (for example, as determined in step 608, step 610, step 612, and step 614). Results of the logistic regression/clustering model show that the test results are statistically significant and prove the proposition as to the effectiveness of the approaches set forth (with respect to method 200 and method 600; and with respect to the preferred value of k being '2').

Referring now generally to the Figures and embodiments of the invention, it should be noted that the various methods, systems, and computer program products described above have application beyond the context of talent framework system 102 of FIG. 1. In fact, the inventor of the claimed invention has also tested the enumerated approaches on text documents that are not related to job-related texts. Tests have shown that these methods aid in distinguishing between "good" and "bad" sentences in other contexts as well. Accordingly, the enumerated embodiments can also be applied to document summarization in different fields like medicine, law, and others, although cluster cutoff values may benefit from adjustment in each of these contexts. Outcomes may be further improved by employing other known techniques, such as TF-IDF with cosine distance similarity, among others. Embodiments of the claimed invention may also provide benefits in the context of tools that generate grammar-based recommendations to a user to, for example, shorten a long and unnecessarily verbose sentence.

Therefore, some applications of embodiments of the claimed invention will now be described more generally (rather than with direct reference to job-related text) in reference to FIGS. 9-11, below. For example, the inventor of the claimed invention tested whether embodiments of the claimed invention improve classification of non-job-related datasets, such as a well curated sample text in FIG. 9.

FIG. 9 is a sample text 900 used to test unsupervised learning method 200 of FIG. 2 and semi-supervised learning method 600 of FIG. 6 to generic text, according to an embodiment of the invention. Sample text 900 is a description of Mount Everest (quoted from Wikipedia).

FIG. 10 is a set of non-useful sentences 1000 extracted from sample text 900 of FIG. 9, according to an embodiment of the invention.

FIG. 11 is a set of non-useful sentences 1100 extracted from sample text 900 of FIG. 9, according to an embodiment of the invention.

Figure 12A:
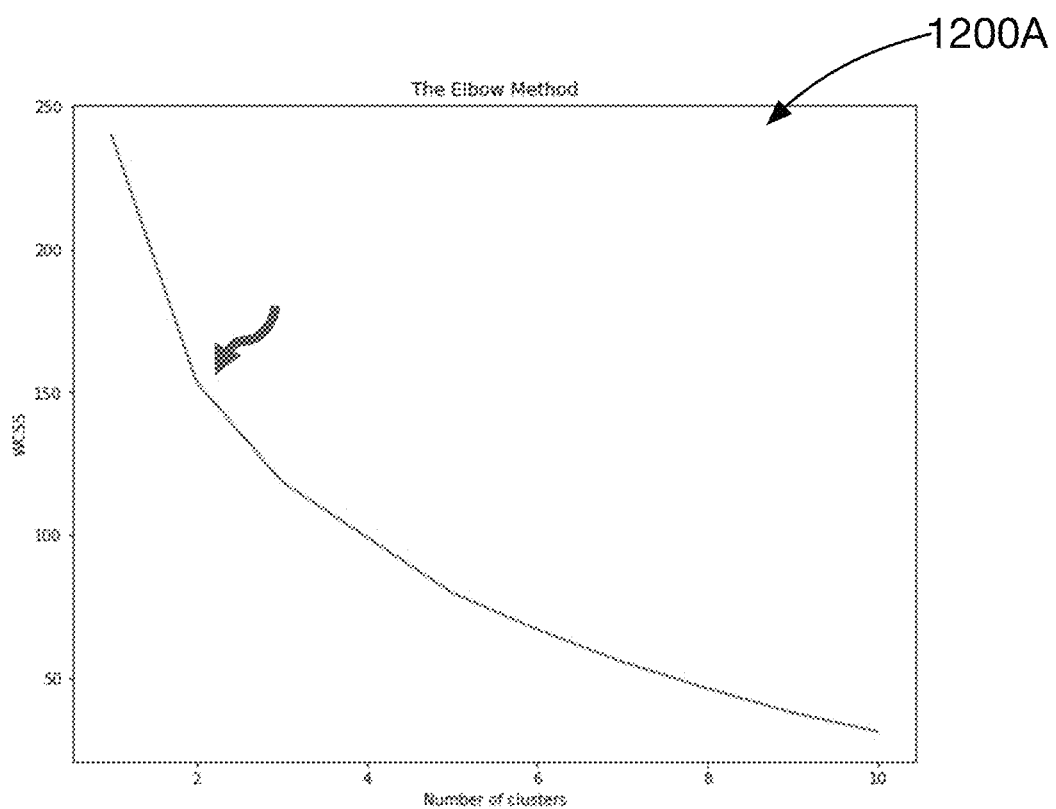
FIG. 12A is a plotted graph 1200A for use in unsupervised learning method 200 of FIG. 2 to perform k-means clustering using the elbow method, and texts described in FIGS. 9-11, according to an embodiment of the invention.

FIG. 12A is a plotted graph 1200A for use in unsupervised learning method 200 of FIG. 2 to perform k-means clustering using the elbow method, and texts described in FIGS. 9-11, according to an embodiment of the invention.

Figure 12B:
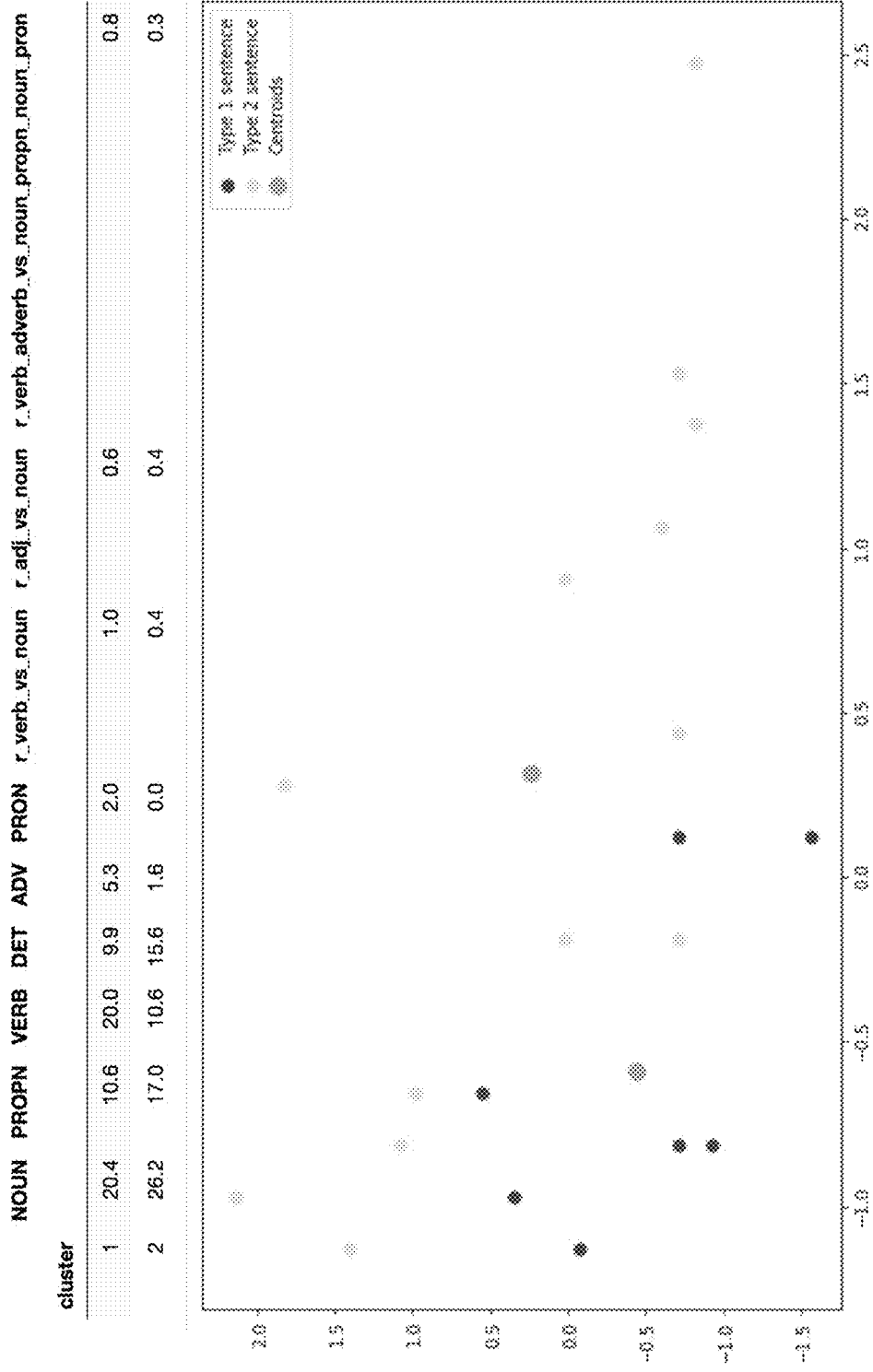
FIG. 12B is a plotted graph 1200B for use in unsupervised learning method 200 of FIG. 2 to perform k-means clustering using cluster plots and average cutoffs, and texts described in FIGS. 9-11, according to an embodiment of the invention.

FIG. 12B is a plotted graph 1200B for use in unsupervised learning method 200 of FIG. 2 to perform k-means clustering using cluster plots and average cutoffs, and texts described in FIGS. 9-11, according to an embodiment of the invention.

Figure 12C:
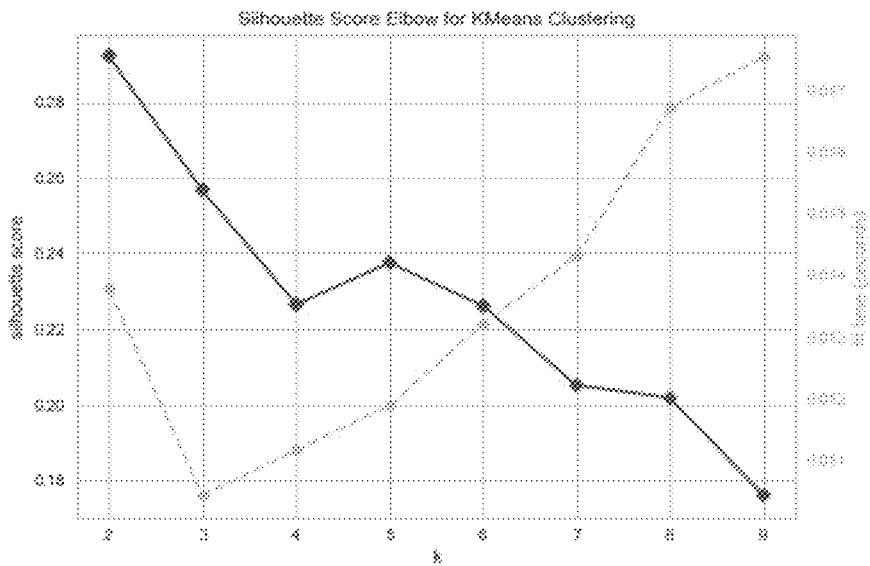
FIG. 12C is a plotted graph 1200C for use in unsupervised learning method 200 of FIG. 2 to perform k-means clustering using the silhouette score elbow method, and texts described in FIGS. 9-11, according to an embodiment of the invention.

FIG. 12C is a plotted graph 1200C for use in unsupervised learning method 200 of FIG. 2 to perform k-means clustering using the silhouette score elbow method, and texts described in FIGS. 9-11, according to an embodiment of the invention.

Figure 12D:
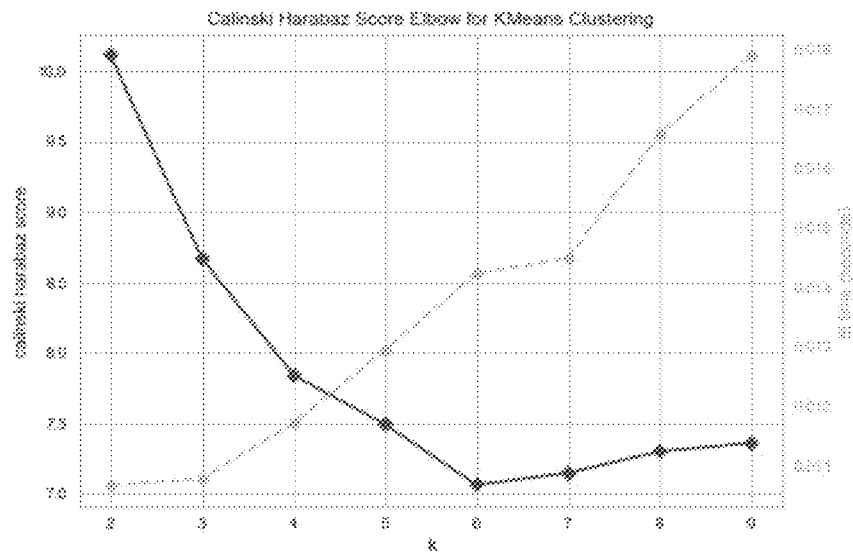
FIG. 12D is a plotted graph 1200D for use in unsupervised learning method 200 of FIG. 2 to perform k-means clustering using the Calinski Harabaz score elbow method, and texts described in FIGS. 9-11, according to an embodiment of the invention.

FIG. 12D is a plotted graph 1200D for use in unsupervised learning method 200 of FIG. 2 to perform k-means clustering using the Calinski Harabaz score elbow method, and texts described in FIGS. 9-11, according to an embodiment of the invention.

Figure 12E:
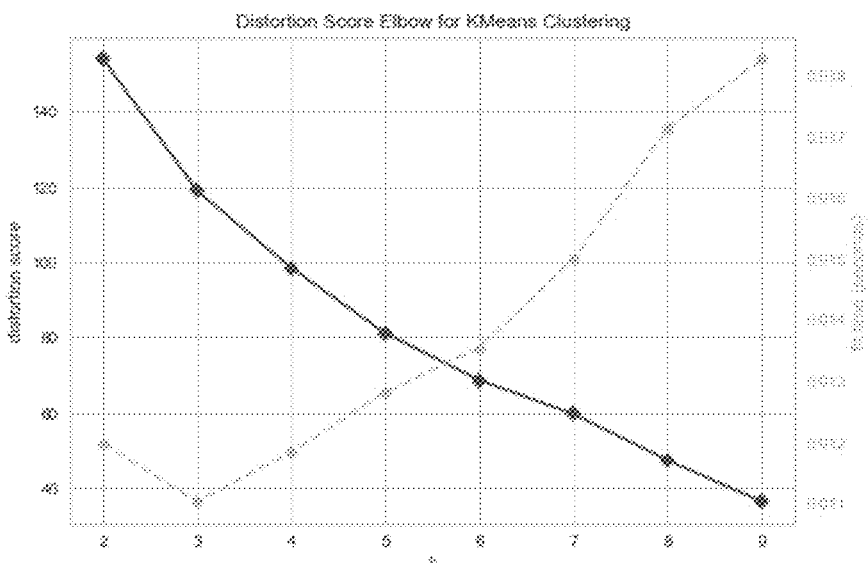
FIG. 12E is a plotted graph 1200E for use in unsupervised learning method 200 of FIG. 2 to perform k-means clustering using the distortion score elbow method, and texts described in FIGS. 9-11, according to an embodiment of the invention.

FIG. 12E is a plotted graph 1200E for use in unsupervised learning method 200 of FIG. 2 to perform k-means clustering using the distortion score elbow method, and texts described in FIGS. 9-11, according to an embodiment of the invention.

Referring now to FIGS. 9-12E, it can generally be observed that clustering and classification results are generally good, with only two outliers (FIG. 12B). The k-means elbow graph (FIG. 12A) is not categorically clear as to whether the optimal value of k is '2' or '3', however consulting plotted graph 1200C, plotted graph 1200D, and plotted graph 1200E (corresponding to the silhouette, Calinski Harabaz, and distorting elbow score methods) verifies that highest cluster scores are achieved where k=2. This experimental data confirms that the inventor's observed and discovered value of k, according to a preferred embodiment, is significant and valuable not just for job-related texts, but to other texts as well, more generally. This is a non-trivial and unexpected result.

Figure 13:
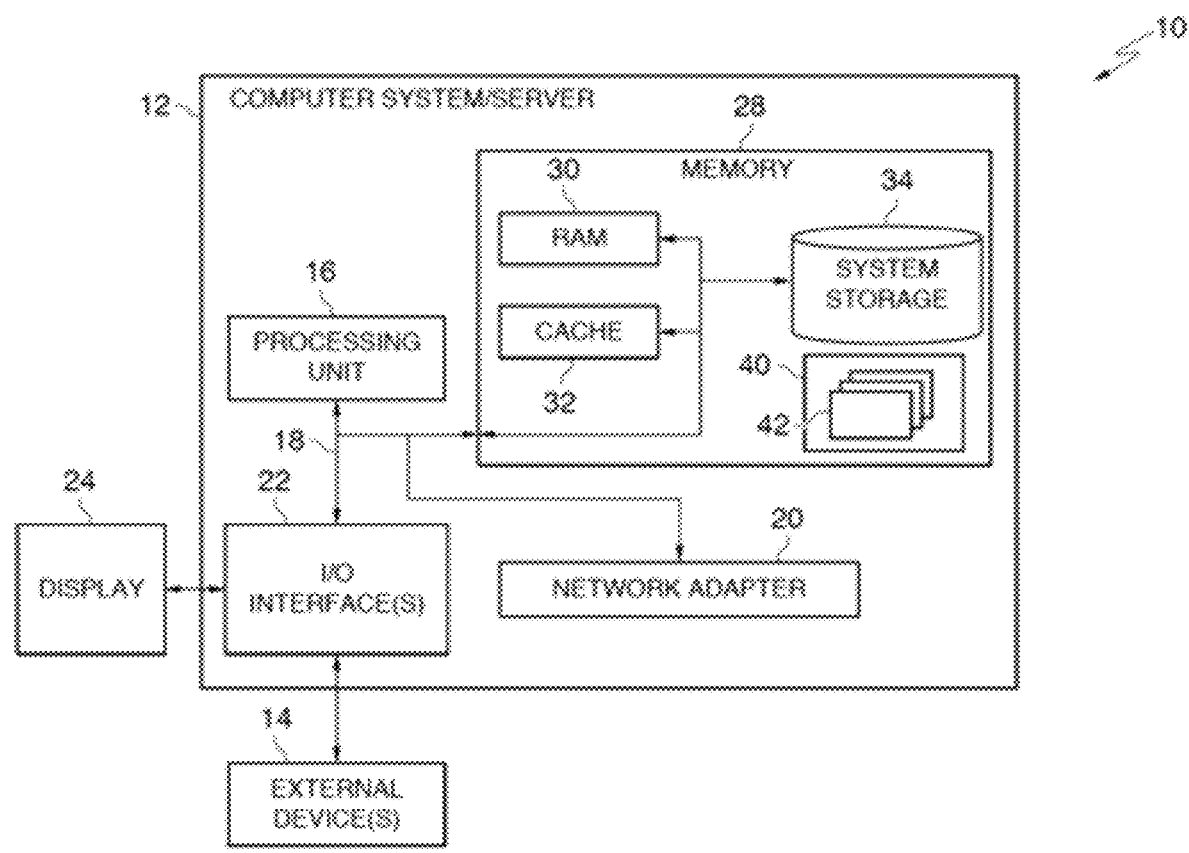
FIG. 13 is a functional block diagram of a computing device and/or a cloud computing node 10, according to an embodiment of the invention.

FIG. 13 is a block diagram of an illustrative cloud computing node, according to an embodiment of the invention. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove (for example, in connection with FIGS. 1-12E, above).

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 14:
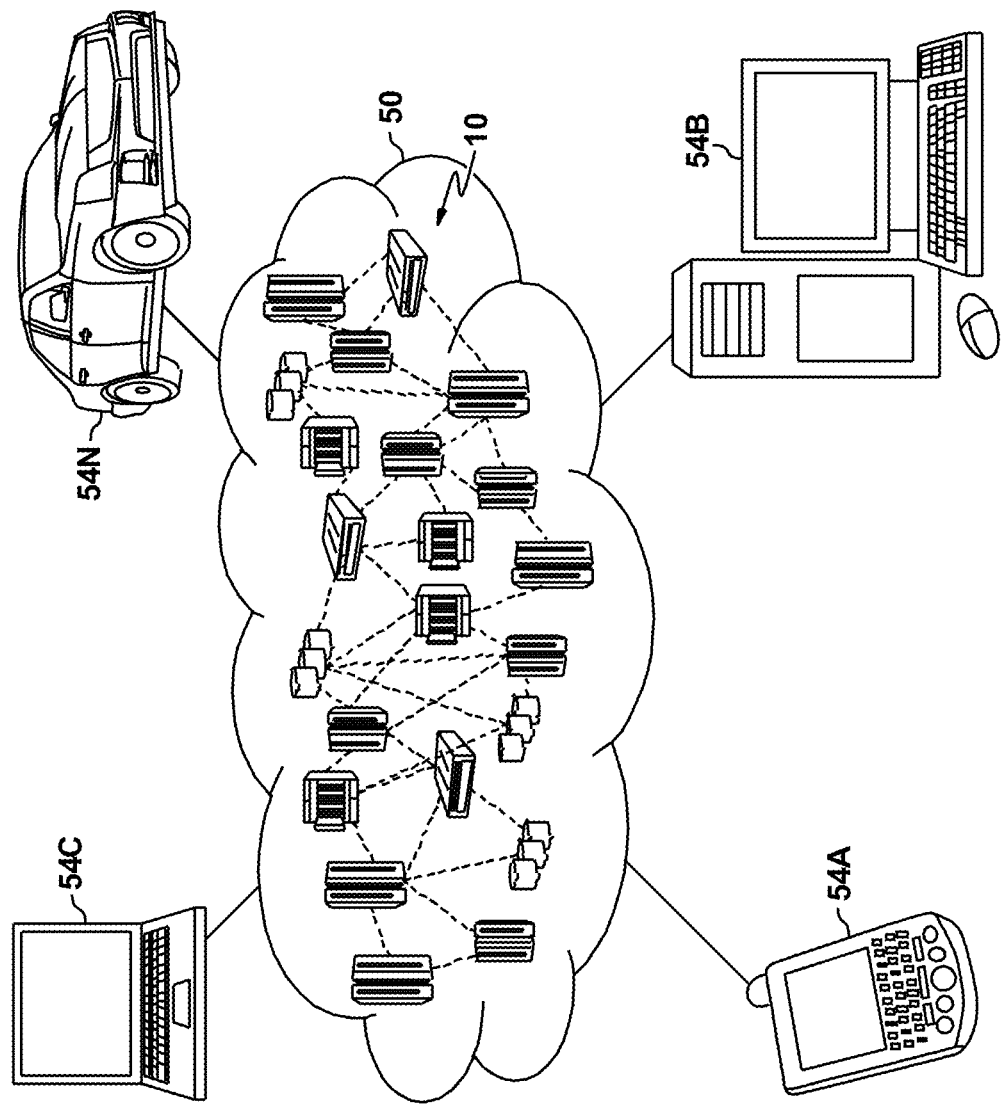
FIG. 14 is a functional block diagram of a cloud computing environment 50 including cloud computing node 10 of FIG. 13, according to an embodiment of the invention.

FIG. 14 is a block diagram of a cloud computing environment including the cloud computing node of FIG. 13, according to an embodiment of the invention. Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that cloud computing nodes 10 and cloud computing environment 50 can communicate with any type of computerized device over any type of network and/or network addressable connection (e.g., using a web browser).

Figure 15:
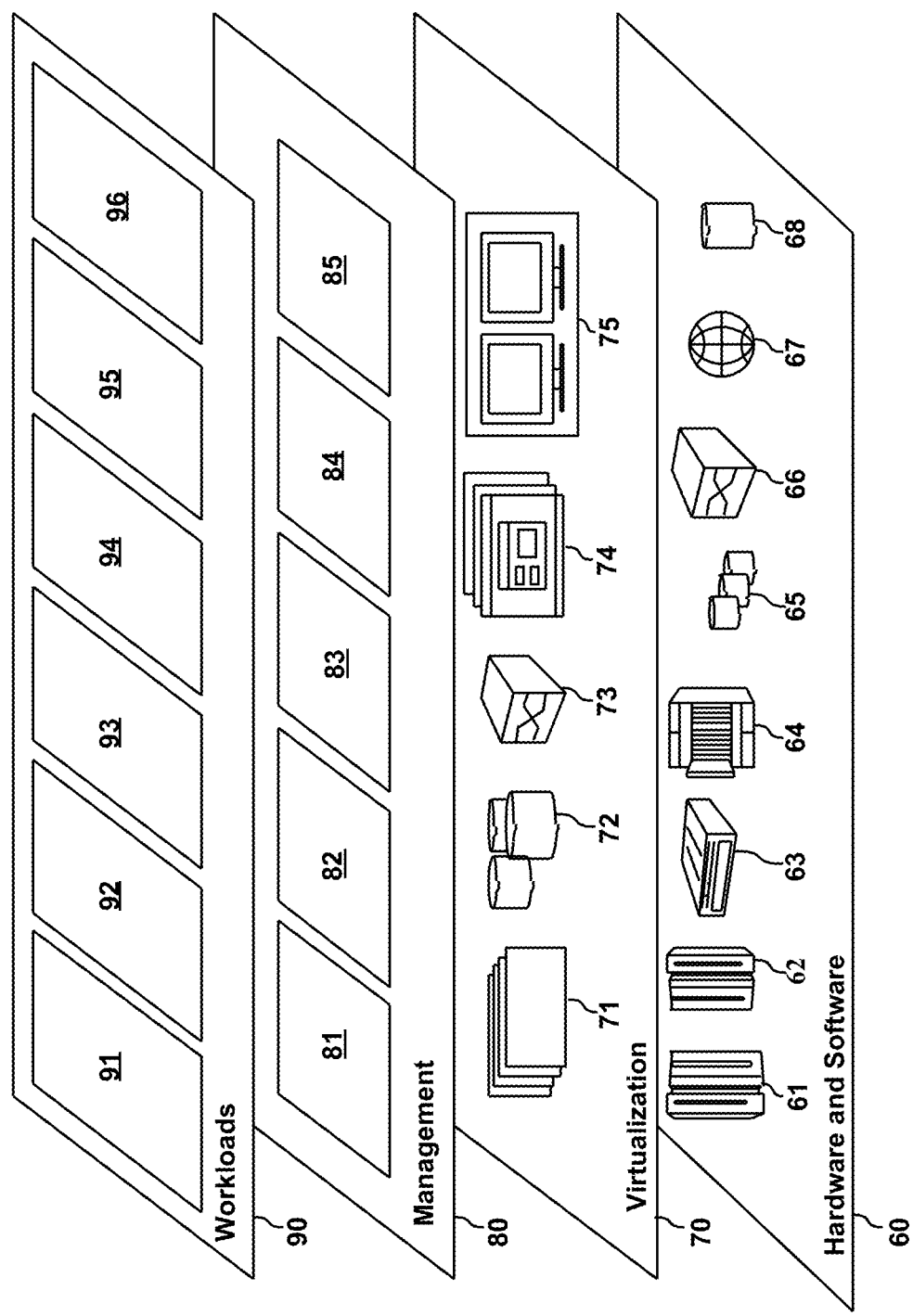
FIG. 15 is a functional block diagram of management and operational layers of cloud computing environment 50 of FIG. 14, according to an embodiment of the invention.

FIG. 15 is a block diagram of functional layers of the cloud computing environment of FIG. 14, according to an embodiment of the invention. Referring now to FIG. 5, a set of functional abstraction layers provided by cloud computing environment 50 is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and natural language processing 96, including the processes and functions described in connection with FIGS. 1-12E, above, and particularly FIG. 2 (method 200) and FIG. 6 (method 600).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, computer implemented methods are provided in the illustrative embodiments. Where an embodiment or a portion thereof is described with respect to a type of device, the computer implemented method, system or apparatus, the computer program product, or a portion thereof, are adapted or configured for use with a suitable and comparable manifestation of that type of device.

The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure.

The present invention may be a method, apparatus and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing a computer database having a plurality of data entries, comprising:
    generating a description text field of a data entry of the computer database by classifying sentences of one or more text streams stored in a text stream corpus,
    wherein the classifying comprises identifying,
    for a given sentence, whether the given sentence is relevant or irrelevant to a title text field of the data entry by clustering the given sentence relative to a plurality of other sentences using k-means clustering,
    and wherein a value of k is determined using a combination of silhouette score elbow methodology and Calinski Harabaz score elbow methodology and distortion score elbow methodology.

2. The method of claim 1, wherein the computer database comprises a job profile library, wherein the data entry comprises a job profile, and wherein the job profile comprises a job title text field and a job description text field.

3. The method of claim 1, wherein a text stream comprises one or more paragraphs.

4. The method of claim 1 wherein a text stream comprises a document, wherein the document comprises one or more paragraphs.

5. The method of claim 1, further comprising: ingesting one or more text streams from the text stream corpus.

6. The method of claim 1, further comprising: extracting features from at least one sentence of at least one text stream ingested from the text stream corpus.

7. The method of claim 6, wherein extracting features comprises: tagging the at least one sentence with parts-of-speech and a frequency of the parts-of speech, using a natural language processing program.

8. The method of claim 7, wherein extracting features further comprises: determining, for the at least one sentence, a percentage of tag frequency relative to a total number of parts-of-speech tags in the at least one sentence.

9. The method of claim 8, wherein the percentage of tag frequency is determined for any one or more of: a verb part-of-speech tag relative to a noun part-of-speech tag; an adjective part-of-speech tag relative to a noun part-of-speech tag; and
    any other part-of-speech tag relative to any other part-of-speech tag.

10. The method of claim 1, wherein identifying, for a given sentence, whether the given sentence is relevant or irrelevant to a title text field of the data entry, comprises: clustering the given sentence relative to a plurality of other sentences using
    an unsupervised learning process or a semi-supervised learning process.

11. The method of claim 1, wherein k=2.

12. The method of claim 1, further comprising:
    presenting results of the classifying to a user; and revising the classifying based on feedback received from the user.

13. The method of claim 11, wherein revising the classifying based on feedback received from the user comprises: using at least one additional feature, removing at least one used feature, or both.

14. The method of claim 1, wherein the clustering is performed to yield, for a cluster of relevant sentences, a mean noun-to-verb ratio of approximately 0.33 or less.

15. The method of claim 1, wherein the clustering is performed to yield, for a cluster of average or below average sentences, a mean noun-to-verb ratio of approximately between 0.33 and 0.45.

16. The method of claim 1, wherein the clustering is performed to yield, for a cluster of irrelevant sentences, a mean noun-to-verb ratio of approximately 0.45 or more.

17. A computer program product for managing a computer database having a plurality of data entries, comprising one or more tangible non-transitory storage media storing programming instructions for execution by a processor to perform a method, the programming instructions comprising instructions for: generating a description text field of a data entry of the computer database by classifying sentences of one or more text streams stored in a text stream corpus, wherein the classifying comprises identifying, for a given sentence, whether the given sentence is relevant or irrelevant to a title text field of the data entry by clustering the given sentence relative to a plurality of other sentences using k-means clustering, and wherein a value of k is determined using a combination of silhouette score elbow
    methodology and Calinski Harabaz score elbow methodology and distortion score elbow methodology.

18. A computer system for managing a computer database having a plurality of data entries, comprising:
    one or more processors; and one or more non-transitory tangible storage media storing programming instructions for execution by the one or more processors to perform a method, the programming instructions comprising instructions for:
  generating a description text field of a data entry of the computer database by classifying sentences of one or more text streams stored in a text stream corpus,
  wherein the classifying comprises identifying, for a given sentence, whether the given sentence is relevant
  or irrelevant to a title text field of the data entry by clustering the given sentence relative to a plurality of other sentences using k-means clustering,
  and wherein a value of k is determined using a combination of silhouette score elbow methodology and Calinski Harabaz score elbow methodology and distortion score elbow methodology.

19. A method for generating electronic natural language text using an input text and a text stream, comprising: clustering, using one or more ratios of parts-of-speech as features, a first plurality of sentences of the text stream as relevant to the input text and a second plurality of sentences of the text stream as irrelevant to the input text, wherein a mean noun-to-verb ratio feature of sentences classified as relevant to the input text is approximately 0.33 or less.

20. The method of claim 19, wherein the clustering yields k clusters each having a mean ratio of parts-of-speech.

21. The method of claim 20, wherein k=2.

* * * * *